US012416718B2

(12) United States Patent
Masaka et al.

(10) Patent No.: US 12,416,718 B2
(45) Date of Patent: Sep. 16, 2025

(54) LEARNING DEVICE, LEARNING METHOD, RECORDING MEDIUM, AND RADAR DEVICE

(71) Applicant: NEC Corporation, Tokyo (JP)

(72) Inventors: Motoki Masaka, Tokyo (JP); Takashi Shibata, Tokyo (JP); Yuichi Abe, Tokyo (JP); Kentarou Kudou, Tokyo (JP); Masanori Kato, Tokyo (JP); Shohei Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 17/792,556

(22) PCT Filed: Jan. 21, 2020

(86) PCT No.: PCT/JP2020/001931
§ 371 (c)(1),
(2) Date: Jul. 13, 2022

(87) PCT Pub. No.: WO2021/149152
PCT Pub. Date: Jul. 29, 2021

(65) Prior Publication Data
US 2023/0061202 A1 Mar. 2, 2023

(51) Int. Cl.
*G01S 13/72* (2006.01)
*G01S 7/288* (2006.01)
(Continued)

(52) U.S. Cl.
CPC ............ *G01S 13/72* (2013.01); *G01S 7/2883* (2021.05); *G01S 7/2926* (2013.01); *G01S 7/417* (2013.01); *G01S 13/28* (2013.01)

(58) Field of Classification Search
CPC ...... G01S 13/72; G01S 7/2883; G01S 7/2926; G01S 13/28; G01S 7/417
See application file for complete search history.

(56) References Cited

U.S. PATENT DOCUMENTS

2012/0223853 A1 9/2012 Shiba
2019/0204416 A1* 7/2019 Yanagi .................... G01S 7/043
(Continued)

FOREIGN PATENT DOCUMENTS

JP H05-297114 A 11/1993
JP H08-220226 A 8/1996
(Continued)

OTHER PUBLICATIONS

Radar Tutorial (Pulse Integration, radartutorial.eu, WayBack Machine, Sep. 23, 2019) (Year: 2019).*

(Continued)

*Primary Examiner* — Lisa M Caputo
*Assistant Examiner* — Christian T Bryant

(57) ABSTRACT

The learning device learns the target detection model used in the radar device. The learning device includes an acquisition unit, a learning data generation unit, and a learning processing unit. The acquisition unit acquires a reception signal generated based on the received wave and a tracking signal generated based on the reception signal from the radar device. The learning data generation unit generates learning data using the reception signal and the tracking signal. The learning processing unit learns a target detection model that detects a target from the reception signal, using the learning data.

13 Claims, 15 Drawing Sheets

(51) Int. Cl.
    *G01S 7/292*     (2006.01)
    *G01S 7/41*     (2006.01)
    *G01S 13/28*     (2006.01)

(56) References Cited

U.S. PATENT DOCUMENTS

| | | | | |
|---|---|---|---|---|
| 2020/0142047 | A1* | 5/2020 | Zwirn | G01S 13/003 |
| 2021/0116540 | A1* | 4/2021 | Santra | G06V 40/23 |

FOREIGN PATENT DOCUMENTS

| | | | |
|---|---|---|---|
| JP | H10-253748 | A | 9/1998 |
| JP | 2012-184989 | A | 9/2012 |
| JP | 2013-210207 | A | 10/2013 |
| JP | 2016-151416 | A | 8/2016 |
| JP | 2019-120543 | A | 7/2019 |

OTHER PUBLICATIONS

Truong et al. ("Generative Adversarial Network for Radar Signal Synthesis," 2019 International Joint Conference on Neural Networks (IJCNN), Budapest, Hungary, 2019, pp. 1-7, doi: 10.1109/IJCNN.2019.8851887.) (Year: 2019).*

Venema et al. ("Correction for clipping of Doppler spectra from clouds and other atmospheric targets," IEEE 1999 International Geoscience and Remote Sensing Symposium. IGARSS'99 (Cat. No.99CH36293), Hamburg, Germany, 1999, pp. 1180-1182 vol.2, doi: 10.1109/IGARSS.1999.774571.) (Year: 1999).*

JP Office Action for JP Application No. 2021-572164, mailed on Aug. 8, 2023 with English Translation.

International Search Report for PCT Application No. PCT/JP2020/001931, mailed on Apr. 7, 2020.

* cited by examiner

LEARNING DEVICE, LEARNING METHOD, RECORDING MEDIUM, AND RADAR DEVICE

This application is a National Stage Entry of PCT/JP2020/001931 filed on Jan. 21, 2020, the contents of all of which are incorporated herein by reference, in their entirety.

TECHNICAL FIELD

The present invention relates to a monitoring technique using a radar.

BACKGROUND ART

There is known a technique for monitoring a moving object such as an aircraft using radar. Patent Document 1 discloses a method for monitoring a moving target such as an aircraft or a vehicle by a radar device.

PRECEDING TECHNICAL REFERENCES

Patent Document

Patent Document 1: Japanese Patent Application Laid-Open under No. 2016-151416

SUMMARY

Problem to be Solved by the Invention

In a radar device, it is necessary to improve the detection performance in order to detect distant targets, small targets, targets existing in clutter, targets existing in jamming signals, or the like. Basically, enlarging the antenna is effective in improving the detection performance, but this increases the hardware and the cost.

One object of the present invention is to improve the detection accuracy of the target in a low-SNR (Signal Noise Ratio) environment while suppressing the cost.

Means for Solving the Problem

According to an example aspect of the present invention, there is provided a learning device comprising:
an acquisition unit configured to acquire a reception signal generated based on a received wave and a tracking signal generated based on the reception signal from a radar device;
a learning data generation unit configured to generate learning data using the reception signal and the tracking signal; and
a learning processing unit configured to learn a target detection model for detecting a target from the reception signal, using the learning data.

According to another example aspect of the present invention, there is provided a learning method comprising:
acquiring a reception signal generated based on a received wave and a tracking signal generated based on the reception signal from a radar device;
generating learning data using the reception signal and the tracking signal; and
learning a target detection model for detecting a target from the reception signal, using the learning data.

According to still another example aspect of the present invention, there is provided a recording medium recording a program, the program causing a computer to execute processing of:
acquiring a reception signal generated based on a received wave and a tracking signal generated based on the reception signal from a radar device;
generating learning data using the reception signal and the tracking signal; and
learning a target detection model for detecting a target from the reception signal, using the learning data.

According to still another example aspect of the present invention, there is provided a radar device comprising:
a transceiver unit configured to transmit a transmission wave and receive a reception signal corresponding to the transmission wave; and
a target detection unit configured to detect a target from the reception signal using a target detection model learned using learning data generated based on the reception signal acquired from the radar device.

Effect of the Invention

According to the present invention, it becomes possible to improve the detection accuracy of the target in a low-SNR (Signal Noise Ratio) environment while suppressing the cost.

EXAMPLE EMBODIMENTS

Preferred example embodiments of the present invention will be described with reference to the accompanying drawings. The radar device in the example embodiments can be used in a monitoring system of moving objects present in the surroundings. Specifically, the radar device detects a moving object (hereinafter, also referred to as a "target") by emitting transmission waves to the surroundings and receiving the reflected waves thereof, and tracks the target if necessary. Targets include, for example, aircrafts flying in the air, vehicles traveling on the ground, and ships traveling over the sea. In the following example embodiments, for convenience of description, it is supposed that radar device is used for air traffic control and the target is primarily an aircraft.

<Basic Configuration of Radar Device>

Figure 1:
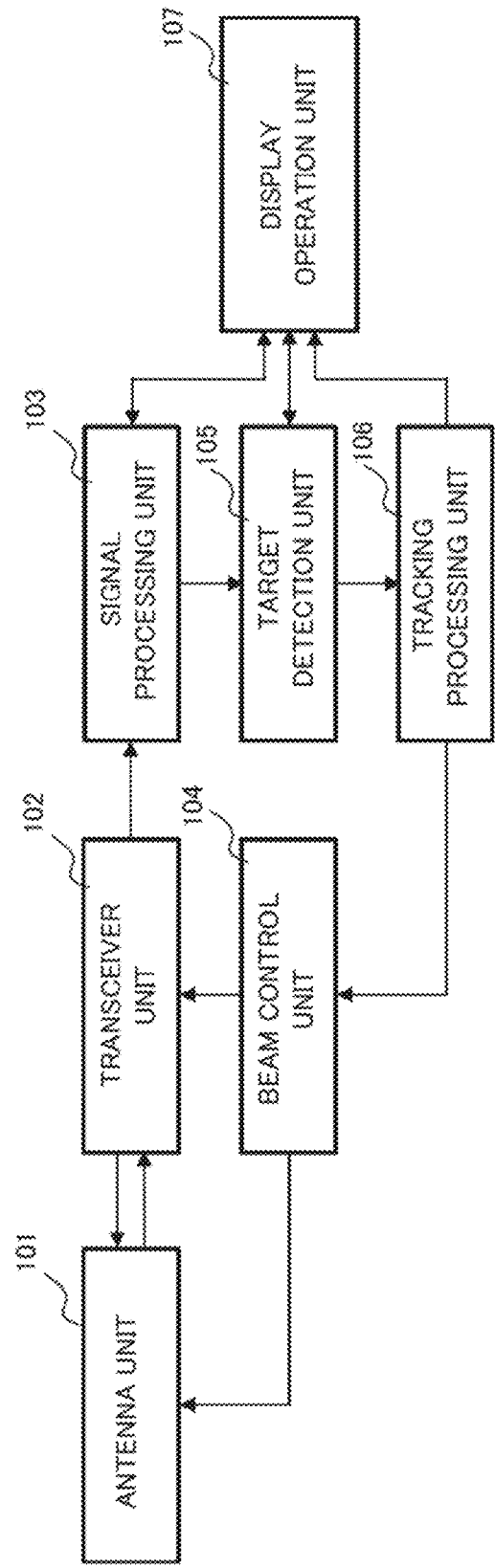
FIG. 1 illustrates a basic configuration of a radar device.

First, the basic configuration of the radar device will be described. FIG. 1 is a block diagram showing a basic configuration of a radar device. The radar device 100 includes an antenna unit 101, a transceiver unit 102, a signal processing unit 103, a beam control unit 104, a target detection unit 105, a tracking processing unit 106, and a display operation unit 107.

The antenna unit 101 amplifies an electric signal inputted from the transceiver unit 102 (hereinafter, also referred to as "transmission signal"), and emits a transmission wave (referred to as "beam") in the transmission direction instructed by the beam control unit 104. Also, the antenna unit 101 converts the reflected wave of the emitted transmission wave reflected by the target to an electric signal (hereinafter, also referred to as "reception signal"), synthesizes the electric signals and outputs a synthesized signal to the transceiver unit 102.

In this example embodiment, the radar device 100 emits a beam (referred to as a "scan beam") that constantly scans all directions (ambient 360°) to monitor the presence of a target in the surroundings. Also, if a target is detected, the radar device 100 emits a beam (referred to as a "tracking beam") to track that target and tracks the trajectory of the target (referred to as a "track"). From this point, the antenna unit 101 is constituted by an antenna capable of changing the transmission direction instantaneously, such as an array antenna comprising a plurality of antenna elements. Specifically, a plurality of planar array antennas may be arranged to cover all directions, or a cylindrical array antenna may be used. Thus, it is possible to emit the tracking beam in the direction of the target when the target is detected, while constantly emitting the scan beam in all directions.

The transceiver unit 102 generates the electric signal based on the transmission wave specification instructed by the beam control unit 104 (hereinafter, also referred to as beam specification), and outputs the electric signal to the antenna unit 101. The beam specification includes the pulse width of the transmission wave, the transmission timing, and the like. Also, the transceiver unit 102 A/D-converts the reception signal inputted from the antenna unit 101, removes the unnecessary frequency band therefrom, and outputs it to the signal processing unit 103 as a reception signal.

Figure 2:
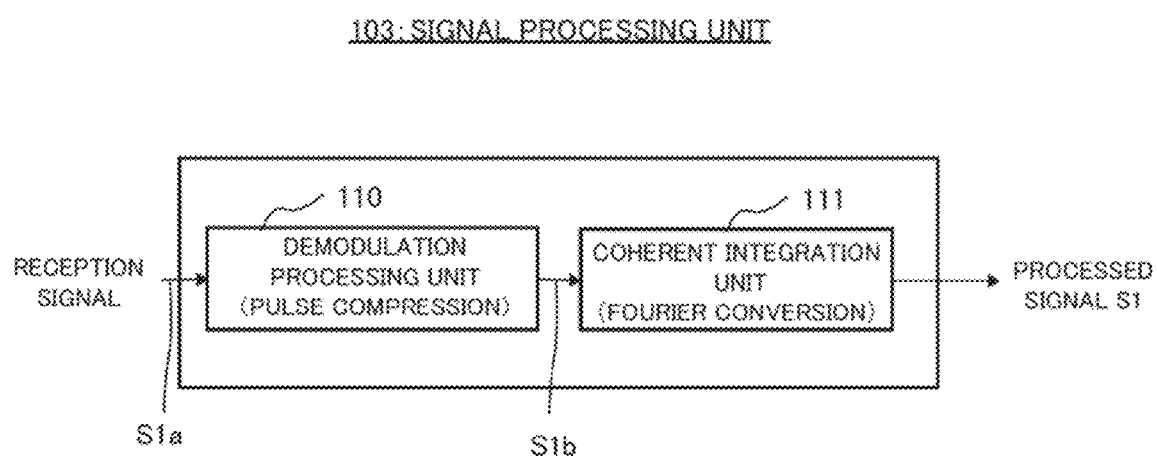
FIG. 2 illustrates a configuration of a signal processing unit.

The signal processing unit 103 applies demodulation processing and integration processing to the reception signal inputted from the transceiver unit 102, and outputs the reception signal after the processing (hereinafter, also referred to as "processed signal") to the target detection unit 105. FIG. 2 is a block diagram showing a configuration of the signal processing unit 103. The signal processing unit 103 includes a demodulation processing unit 110, and a coherent integration unit 111. The demodulation processing unit 110 demodulates (performs pulse compression of) the reception signal inputted from the transceiver unit 102. Essentially, sharp transmission waves (transmission pulses) with high power are required to detect distant targets by radar, but there is a limit to power enhancement due to constraints such as hardware. Therefore, at the time of emitting the beam, the transceiver unit 102 generates the transmission waves of long duration by frequency-modulating the transmission signals having a predetermined pulse width, and transmits them from the antenna unit 101. Correspondingly, the demodulation processing unit 110 demodulates the reception signal inputted from the transceiver unit 102 to generate the sharp reception pulses, and outputs them to the coherent integration unit 111.

The coherent integration unit 111 removes noise by coherently integrating the plural pulses inputted from the demodulation processing unit 110, thereby to improve the SNR. The radar device 100 emits a plurality of pulses in the same direction (in the same azimuth and the same elevation angle) in order to detect the target with high accuracy. The number of pulses emitted in the same direction is called "hit number". The coherent integration unit 111 integrates the reception signal (the reception pulses) of the beam of a predetermined hit number emitted in the same direction, and thereby improves the SNR of the reception signal. Incidentally, the number of the reception pulses integrated by the coherent integration unit 111 is also referred to as "integration pulse number". The integration pulse number is basically equal to the hit number of the emitted beam.

Returning to FIG. 1, the target detection unit 105 detects the target from the processed signal inputted from the signal processing unit 103 using a predetermined threshold. The target detection unit 105 measures the distance, the azimuth, and the elevation of the target, and outputs them as the target detection result (hereinafter, referred to as "plot") to the tracking processing unit 106. The plot includes the distance, the azimuth, the elevation, the SNR of the target. Further, the target detection unit 105 sets the threshold value for detecting the target, based on the threshold setting value inputted from the display operation unit 107.

The tracking processing unit 106 performs tracking processing for a plurality of plots inputted from the target detection unit 105 and calculates the track of the target. Specifically, the tracking processing unit 106 predicts the position of the target at the current time (referred to as "estimated target position") based on the plurality of plots, and outputs it to the display operation unit 107. Further, the tracking processing unit 106 calculates the predicted position of the target (referred to as "predicted target position") based on the plurality of plots and outputs it to the beam control unit 104. The predicted target position indicates the position where the radar device 100 irradiates the tracking beam next.

The beam control unit 104 determines the transmission direction and the beam specification of the scan beam according to a preset beam schedule. Further, the beam control unit 104 determines the transmission direction and the beam specification of the tracking beam based on the predicted target position inputted from the tracking processing unit 106. Then, the beam control unit 104 outputs the transmission directions of the scan beam and the tracking beam to the antenna unit 101, and outputs the beam specification of the scan beam and the tracking beam to the transceiver unit 102.

The display operation unit 107 includes a display unit such as a display, and an operation unit such as a keyboard, a mouse, and operation buttons. The display operation unit 107 displays the positions of the plurality of plots inputted from the target detection unit 105, and the predicted target position inputted from the tracking processing unit 106. This allows the operator to see the current position and/or the track of the detected target. Further, by operating the display operation unit 107, the operator can input the threshold used for the target detection to the target detection unit 105 or input the clutter determination result that the signal processing unit 103 uses for demodulation processing to the signal processing unit 103. Incidentally, the "clutter" is a signal generated by the emitted radar reflected by the object other than the target. Out of the plurality of plots displayed on the display operation unit 107, the operator can determine an area that is considered to be clutter due to experience, and operate the display operation unit 107 to designate the area. This is called "clutter determination".

With the above configuration, the radar device 100 detects the target by constantly emitting the scan beam in all directions, and emits the tracking beam to the predicted target position to track the target when the target is detected.

First Example Embodiment

In a radar device, in order to detect targets with low SNR, such as distant targets and small targets, and targets that exist in clutter or jamming signals, detection performance should be improved. As described above, the normal target detection unit detects the target from the processed signal using a predetermined threshold value. However, in a situation where the SNR is low, the target signal is buried in the clutter, noise, or jamming signals, and the detection accuracy of the target is lowered. Basically, enlarging the antenna improves the detection performance, but this increases the hardware and the cost. Therefore, in the present example embodiment, the target is detected using a model generated by machine learning. Specifically, the target detection model is learned by using the reception signals and teacher labels (correct labels) indicating the presence/absence of the target or the position of the target, and the learned target detection model is applied to the target detection unit. Thus, it becomes possible to improve the detection performance while suppressing the cost.

[Configuration During Learning]
(Overall Configuration)

Figure 3:
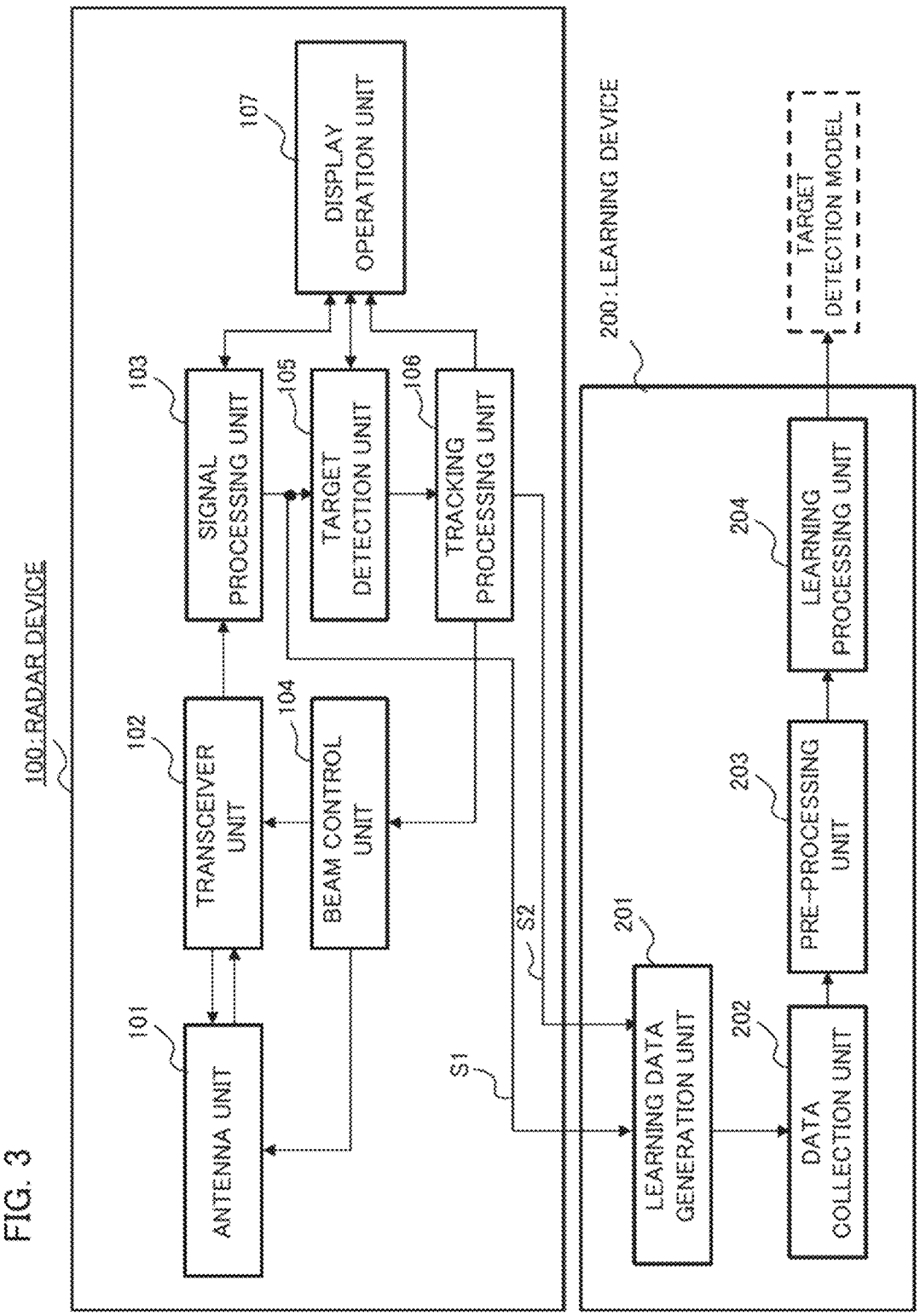
FIG. 3 illustrates a configuration for learning a target detection model.

FIG. 3 is a block diagram illustrating a configuration of a radar device at the time of learning a target detection model. At the time of learning, there is provided a learning device 200 for learning a target detection model based on the signals acquired from the radar device 100. Since the radar device 100 is similar to that shown in FIG. 1, description thereof will be omitted. The learning device 200 includes a learning data generation unit 201, a data collection unit 202, a pre-processing unit 203, and a learning processing unit 204.

The learning data generation unit 201 acquires the processed signal S1 outputted from the signal processing unit 103 of the radar device 100. The processed signal S1 is the reception signal received by the radar device 100, and is the reception signal after the noise removal processing is applied by the signal processing unit 103.

Further, the learning data generation unit 201 acquires the tracking signal S2 of the target outputted from the tracking processing unit 106 of the radar device 100. The tracking signal S2 includes the plots and the track of the target tracked by the tracking processing unit 106. The learning data generation unit 201 generates the teacher label used for learning using the tracking signal S2.

The learning data generation unit 201 generates the learning data for learning the target detection model. The learning data is a pair of the processed signal S1 of a predetermined unit and a teacher label (correct label) for that processed signal S1. For each of the processed signal S1 of the predetermined unit, the learning data generation unit 201 generates a teacher label by referring to the tracking signal S2 corresponding to the processed signal S1 of the predetermined unit. Specifically, the learning data generation unit 201 refers to the plots and the track of the target included in the tracking signal S2 and generates a teacher label indicating the presence or absence of the target and the position of the target in the processed signal S1 of the predetermined unit. Then, the learning data generation unit 201 sets a pair of the processed signal S1 of the predetermined unit and the corresponding teacher label as the learning data and outputs the learning data to the data collection unit 202.

The data collection unit 202 stores the learning data inputted from the learning data generation unit 201. The data collection unit 202 stores the learning data in which the teacher label is assigned to each of the processed signal S1 of the predetermined unit.

The pre-processing unit 203 acquires the learning data from the data collection unit 202. The pre-processing unit 203 performs pre-processing for processing the learning data prior to the learning processing in the learning processing unit 204. Examples of the pre-processing include the followings.

(A) Trimming of the Processed Signal

One example of pre-processing is trimming of the processed signal to a size appropriate for feature value extraction. The target detection model learned in the learning processing unit 204 extracts the feature value from the processed signal included in the learning data and detects the target. Therefore, it is effective to trim the processed signal to a size capable of accurately extracting the feature value from the processed signal in the learning processing unit 204.

Figure 4A:
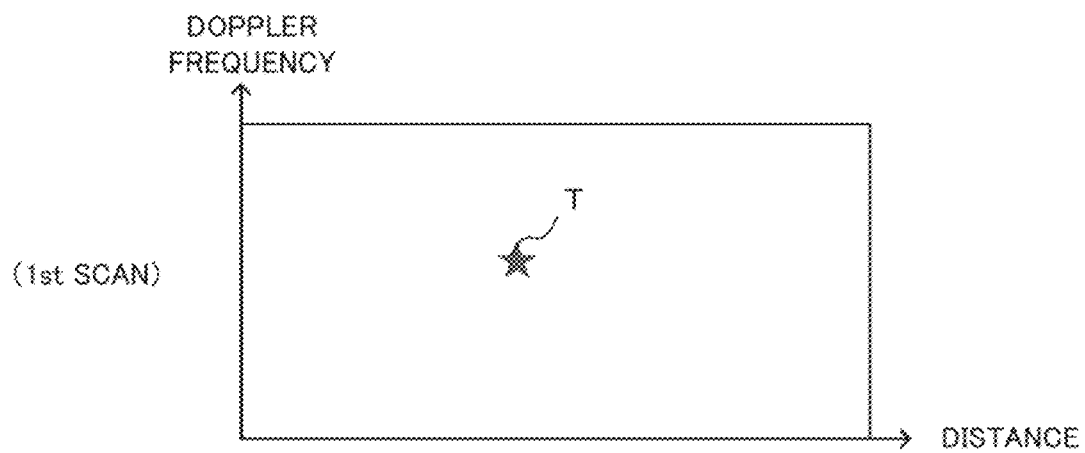
FIGS. 4A and 4B illustrate an example of trimming a processed signal.
Figure 4B:
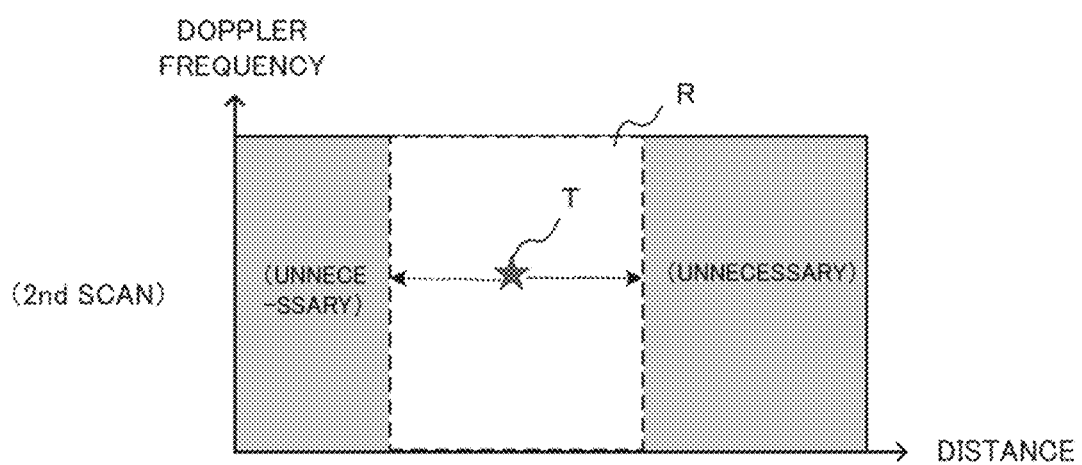

FIG. 4 shows an example of trimming the processed signal. FIG. 4A is a graph showing the processed signal of the first scan of the scan beam in a predetermined direction. The horizontal axis shows the distance from the radar device 100 and the vertical axis shows the Doppler frequency. Now, it is assumed that the target T is detected at the position shown in the processed signal of the first scan. Since the target T is an aircraft or the like and its maximum speed and turning direction can be predicted, the range R in which the target T can move before the second scan can be predicted. Therefore, as the processed signal of the second scan, the portion other than the range R can be removed by trimming. Thus, it is possible to reduce the amount of data that is subject to the learning processing.

(B) Data Integration

When a target is detected by the target detection model, the detection accuracy may be improved by considering not only a portion of the processed signal but also one or more portions adjacent thereto. For example, in addition to the processed signal acquired by the beam emitted in a certain direction (azimuth and elevation), the processed signal acquired by the adjacent beam emitted in a direction adjacent thereto may be processed collectively to improve the detection accuracy of the target. Further, in addition to the processed signal of a certain scan, by collectively processing the processed signal of the scan adjacent to it in time, the detection accuracy may be improved by considering the temporal variation. Therefore, it is effective to perform data integration processing for the processed signal of the predetermined unit. For example, the pre-processing unit 203 may integrate the processed signals S1 acquired by the plurality of adjacent beams into a unit of data used for learning. Incidentally, the adjacent beams may be composed of a plurality of DBF (Digital Beamforming) beams or MIMO (Multiple Input Multiple Output) beams. Further, the pre-processing unit 203 may integrate the processed signals S1 of a plurality of consecutive scans into a unit of data used for learning.

(C) SNR Deterioration

By learning a target detection model using learning data in which SNR is deteriorated by intentionally adding noise to the processed signal, it becomes possible to generate a target detection model with high detection accuracy even in an environment with low SNR.

Incidentally, the pre-processing unit 203 may execute one of the above-described pre-processing, or may execute two or more of the above-described pre-processing in combination. The pre-processing unit 203 outputs the learning data including the processed signal after the pre-processing to the learning processing unit 204. The learning processing unit 204 learns the target detection model using the inputted learning data and generates the learned target detection model.

(Hardware Configuration of Learning Device)

Figure 5:
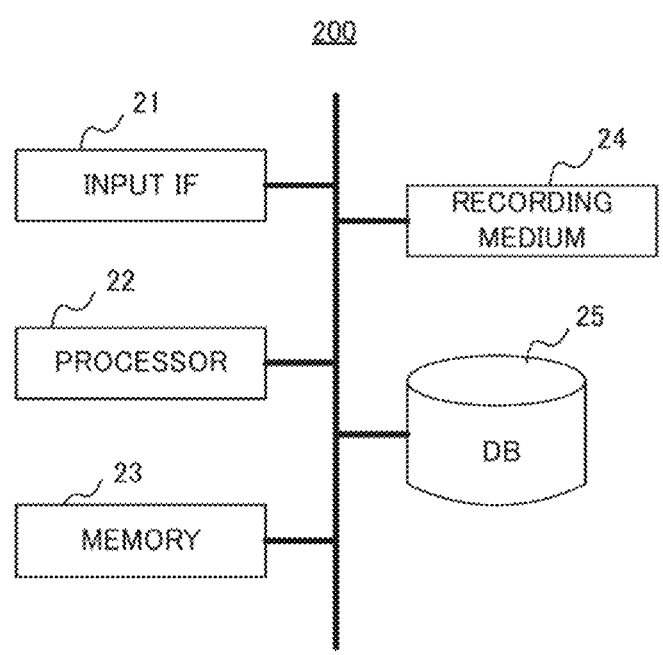
FIG. 5 illustrates a hardware configuration of a learning device.

FIG. 5 is a block diagram illustrating a hardware configuration of the learning device 200 illustrated in FIG. 3. As illustrated, the learning device 200 includes an input IF (InterFace) 21, a processor 22, a memory 23, a recording medium 24, and a database (DB) 25.

The input IF 21 inputs and outputs data to and from the radar device 100. Specifically, the input IF 21 acquires the processed signal S1 and the tracking signal S2 from the radar device 100. The processor 22 is a computer including a CPU (Central Processing Unit), a GPU (Graphics Processing Unit), and the like, and controls the entire learning device 200 by executing a program prepared in advance. The processor 22 functions as the learning data generation unit 201, the pre-processing unit 203, and the learning processing unit 204 shown in FIG. 3.

The memory 23 is composed of ROM (Read Only Memory), RAM (Random Access Memory), and the like. The memory 23 stores various programs to be executed by the processor 22. The memory 23 is also used as a work memory during the execution of various processes by the processor 22.

The recording medium 24 is a non-volatile, non-transitory recording medium such as a disk-shaped recording medium, a semiconductor memory, or the like, and is configured to be detachable from the learning device 200. The recording medium 24 records various programs to be executed by the processor 22. When the learning device 200 performs processing, a program recorded on the recording medium 24 is loaded into the memory 23 and executed by the processor 22.

The DB 25 stores data inputted through the input IF 21 and data generated by the learning device 200. Specifically, the DB 25 stores the processed signal S1 and the tracking signal S2 inputted from the radar device 100, and the learning data generated by the learning data generation unit 201.

(Learning Processing)

Figure 6:
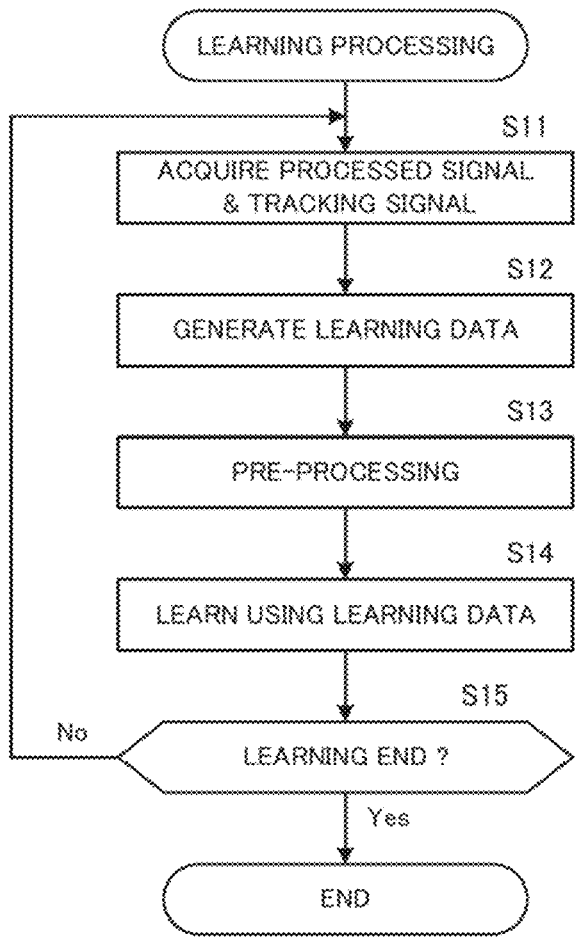
FIG. 6 is a flowchart of learning processing by the learning device.

FIG. 6 is a flowchart of the learning processing performed by the learning device 200. This processing can be implemented by the processor 22 shown in FIG. 5, which executes a program prepared in advance and operates as each element shown in FIG. 3.

First, the learning data generation unit 201 acquires the processed signal S1 outputted by the signal processing unit 103 of the radar device 100 and the tracking signal S2 outputted by the tracking processing unit 106 (step S11). Next, the learning data generation unit 201 generates the learning data including the processed signal of the predetermined unit and the teacher label therefor using the processed signal S1 and the tracking signal S2, and stores the learning data in the data collection unit 202 (step S12).

Next, the pre-processing unit 203 reads out the learning data stored in the data collection unit 202, applies the above-described pre-processing to the processed signal, and outputs the learning data including the processed signal after the pre-processing to the learning processing unit 204 (step S13). The learning processing unit 204 learns the target detection model using the inputted learning data (step S14).

Next, the learning processing unit 204 determines whether or not a predetermined learning end condition is satisfied (step S15). An example of the learning end condition is that learning using a predetermined amount of learning data has been completed. The learning processing unit 204 repeats the learning until the learning end condition is satisfied. When the learning end condition is satisfied, the processing ends.

(Other Examples of Learning Devices)

Figure 7:
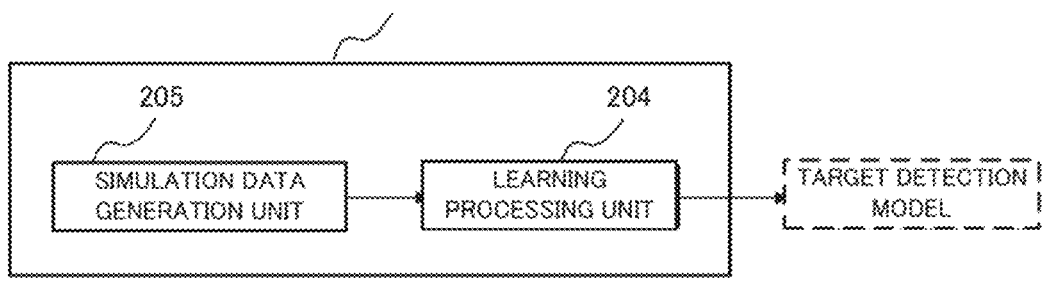
FIG. 7 illustrates another example of a learning device.

FIG. 7 shows another example of the learning device. The learning device 200 shown in FIG. 3 generates the learning data using the processed signal S1 and the tracking signal S2, that is, the actual data generated in the actual radar device 100. Instead, learning data may be prepared by simulation and learning may be performed. FIG. 7 shows a learning device 200a using simulation data. The learning device 200a includes a simulation data generation unit 205 and a learning processing unit 204. The simulation data generation unit 205 generates learning data (simulation data) including the processed signal in various situations and the teacher labels corresponding thereto by simulation and inputs the learning data to the learning processing unit 204. The learning processing unit 204 is basically the same as that shown in FIG. 3 and learns the target detection model using the simulation data. Incidentally, the example of FIG. 3 and this example may be combined to learn one target detection model by using the learning data generated based on the actual data of the radar device 100 together with the simulation data.

[Radar Device to which the Target Detection Model is Applied]

(Configuration)

Figure 8:
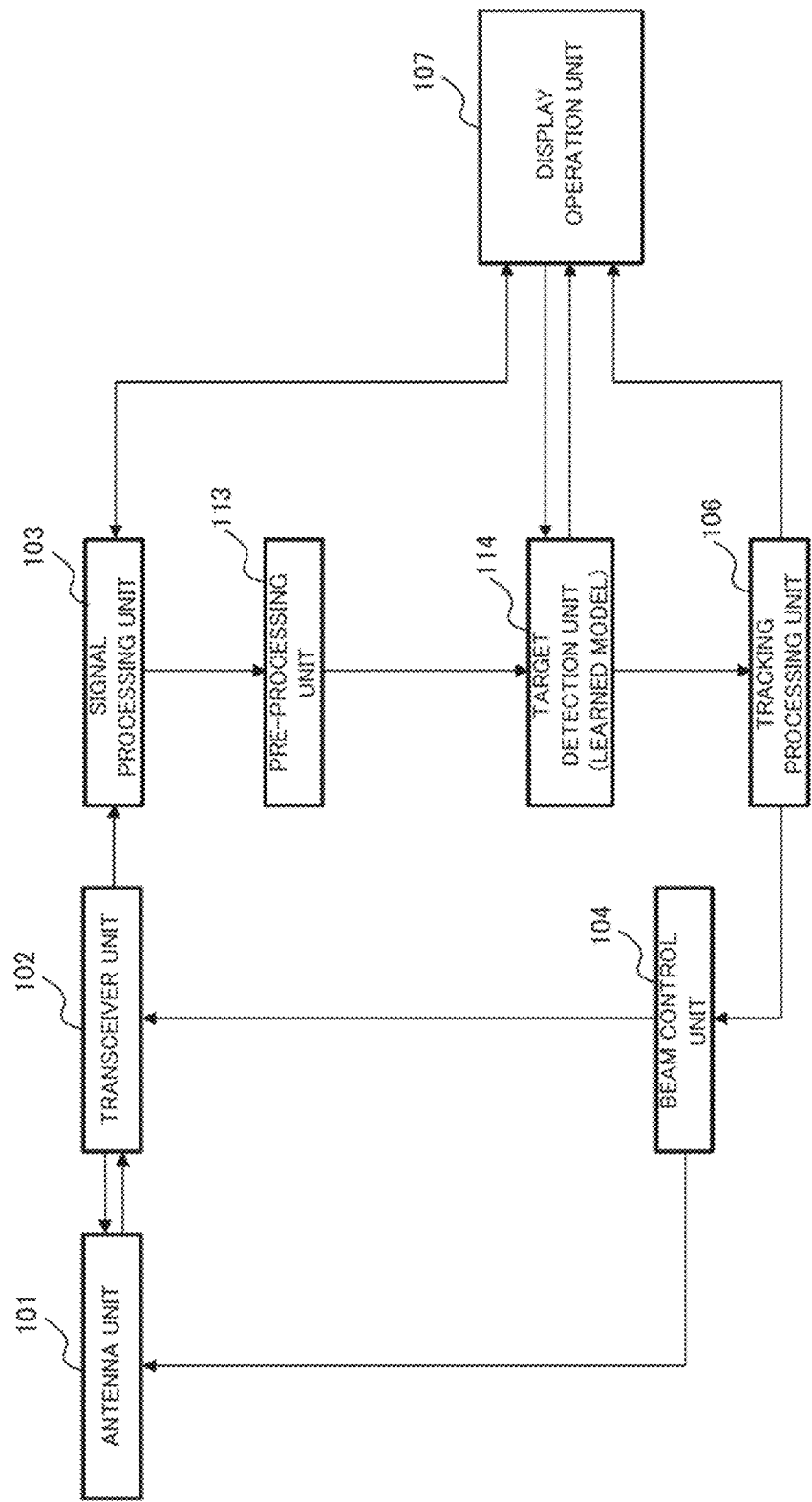
FIG. 8 illustrates a configuration of the radar device to which the learned model is applied.

FIG. 8 is a block diagram showing a configuration of a radar device 100x to which a learned target detection model is applied. As can be seen from comparison with FIG. 1, the radar device 100x includes a pre-processing unit 113 and a target detection unit 114 instead of the target detection unit 105 in FIG. 1. The configuration other than the pre-processing unit 113 and the target detection unit 114 are the same as those in FIG. 1 and will not be described.

A learned target detection model generated by the learning processing described above is set in the target detection unit 114. The pre-processing unit 113 generates a signal that the target detection model set in the target detection unit 114 uses as an input. In other words, the pre-processing unit 113 applies, to the processed signal outputted from the signal processing unit 103, the same pre-processing as that applied to the learning data when the target detection model is learned by the learning device 200. For example, when the learning device 200 performs the learning of the target detection model using the aforementioned processing (A), i.e., using the learning data generated by trimming the processed signal, the pre-processing unit 113 performs the same pre-processing (A) and outputs the obtained processed signal to the target detection unit 114. The target detection unit 114 detects the target from the inputted processed signal using the learned target detection model. Specifically, the target detection unit 114 generates the plots including the distance, speed, identification, azimuth, elevation angle, SNR, and the like of the target using the target detection model, and outputs the plots to the tracking processing unit 106. Incidentally, "identification" indicates the type of target, etc., and refers to discrimination between an artificial satellite, aircraft, missile, or ship, or discrimination between a fixed-wing aircraft or a rotary-wing aircraft.

(Target Detection Processing)

Figure 9:
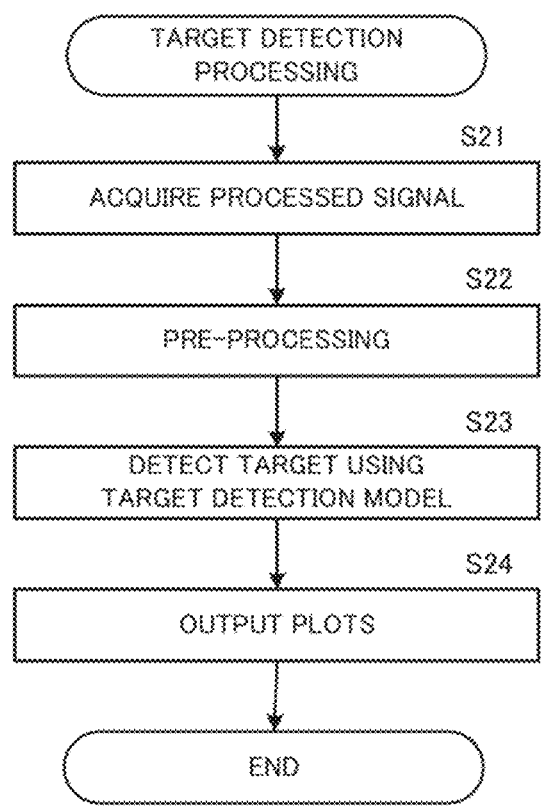
FIG. 9 is a flowchart of target detection processing by the radar device.

FIG. 9 is a flowchart of the target detection processing by the radar device 100x. This processing is executed for each processed signal outputted from the signal processing unit 103. First, the pre-processing unit 113 acquires the processed signal from the signal processing unit 103 (step S21), and performs pre-processing for the target detection model used by the target detection unit 114 (step S22). Next, the target detection unit 114 detects the target using the target detection model based on the processed signal after the pre-processing inputted from the pre-processing unit 113 (step S23), and outputs the plots of the detected target (step S24).

As described above, according to the radar device 100x of the present example embodiment, by learning the target detection model using the learning data in the environment in which the SNR is low, it is possible to improve the target detection accuracy in the environment in which the SNR is low without performing hardware enhancement or the like.

[Generation of Learning Data]

(1) Use of Reception Signals Other than the Processed Signals

In the above-described example embodiment, the learning device 200 performs learning of the target detection model using the processed signal S1 outputted by the signal processing unit 103. As shown in FIG. 2, the processed signal S1 is the reception signal acquired after applying the demodulation processing by the demodulation processing unit 110 and the integration processing by the coherent integrator 111 to the reception signal outputted by the transceiver unit 102. Instead, the learning device 200 may perform learning of the target detection model using the reception signal S1a before performing the demodulation processing or the reception signal S1b before performing the integration processing as shown in FIG. 2. In that case, in the radar device 100x shown in FIG. 8, the signal processing unit 103 outputs the reception signal S1a before performing the demodulation processing or the reception signal S1b before performing the integration processing to the pre-processing unit 113. These reception signals are signals before SNR improvement processing by the demodulation processing unit 110 and the coherent integration unit 111. Therefore, if the learning is performed using these reception signals, SNR loss that occurs in the existing processing (demodulation processing or coherent integration) can be eliminated, and a model capable of extracting the feature value with higher SNR improvement performance than the existing processing can be acquired by the learning. As a result, it becomes possible to generate a target detection model with high detection accuracy.

(2) Synthesizing Desired Data

It is difficult to collect the learning data necessary for learning of the target detection model with respect to rarely occurring situations, for example, for rare occurrences (e.g., weather clutter occurring due to rainfall, snowfall, etc., small targets, etc.) or for the case where the radar device 100 is operated in an operation mode that is rarely used. Therefore, the learning data generation unit 201 generates the learning data in a situation that rarely occurs using a plurality of collected data. Specifically, the learning data generation unit 201 generates the desired learning data by synthesizing a plurality of collected data or thinning out the collected data.

As a first example, when a reception signal in which a target exists in the clutter is required, the learning data generation unit 201 may generate a reception signal by adding the reception signal of the target to the reception signal of the clutter. As a second example, when a reception signal of a small target is required, the learning data generation unit 201 may attenuate the amplitude of the reception signal of the target of the normal size and generate the reception signal obtained by further adding the noise.

As a third example, when a reception signal of a beam having a low gain (SNR improving effect) is required, the learning data generation unit 201 may generate a processed signal for which the number of data subjected to the coherent integration by the coherent integration unit 111 in the signal processing unit 103, i.e., the number of the integration pulses, is reduced. As a fourth example, when a reception signal having a narrow phase dispersion band and a low sampling frequency is required, the learning data generation unit 201 may generate a reception signal by applying a narrow band filter to the reception signal and then applying decimation (decimation of sampling) to the receiving signal. Incidentally, although the data actually collected by the radar device 100 is synthesized in the above example, if the desired data cannot be collected, the collected data and the simulation data generated by simulation may be synthesized.

(3) Reconstruction of a Reception Signal of a Desired Beam Specification

For a beam specification that is rarely used in the radar device 100, it is difficult to generate the learning data of necessary amount. Here, "a beam specification" refers to a pulse width, a phase dispersion region, and a number of integration pulses. In this case, it is possible to reconstruct a reception signal of a desired beam specification by applying the reverse processing of the signal processing performed by the signal processing unit 103 to the processed signal outputted by the signal processing unit 103 and by using the desired beam specification at that time.

Figure 10:
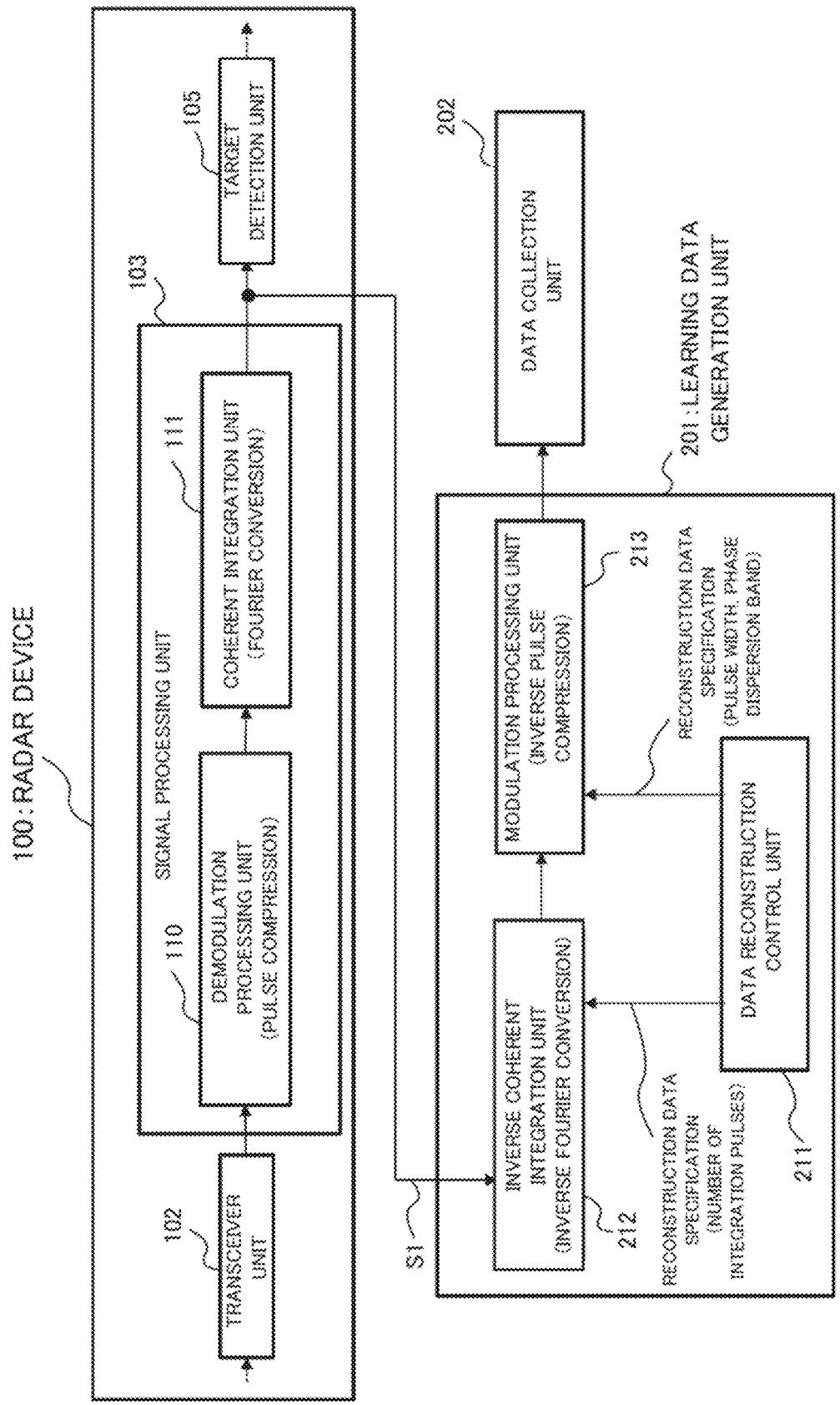
FIG. 10 illustrates a configuration for reconstructing a reception signal of desired beam dimension.

FIG. 10 shows a configuration for reconstructing a reception signal of a desired beam specification. In FIG. 10, for convenience of explanation, only the transceiver unit 102, the signal processing unit 103, and the target detection unit 105 in the radar device 100, and the learning data generation unit 201 and the data collection unit 202 in the learning device 200 are illustrated. The learning data generation unit 201 includes a data reconstruction control unit 211, an inverse coherent integration unit 212, and a modulation processing unit 213.

From the signal processing unit 103 of the radar device 100, the processed signal S1 is inputted to the learning data generation unit 201. The data reconstruction control unit 211 generates a beam specification to be reconstructed, instructs the number of the integration pulses to the inverse coherent integration unit 212, and instructs the pulse width and the phase dispersion band to the modulation processing unit 213. The inverse coherent integration unit 212 integrates the processed signal S1 for the number of integration pulses instructed from the data reconstruction control unit 211, and outputs the result to the modulation processing unit 213. The modulation processing unit 213 modulates the input signal with the pulse width and the phase dispersion band instructed from the data reconstruction control unit 211, and outputs the result to the data collection unit 202. Thus, a reception signal of a desired beam specification different from the collected reception signal can be generated and used for the learning processing.

(4) Generation Method of Teacher Label

When the learning data is generated in the learning device 200, the teacher label indicating the position of the target can be generated in the following manner.

(A) Use of Primary Radar

When the primary radar (PSR: Primary Surveillance Radar) is used, as described with reference to FIG. 1, the learning data generation unit 201 may acquire the position of the target from the tracking information generated by the tracking processing unit 106 and generate the teacher label.

(B) Use of Secondary Radar

Figure 11:
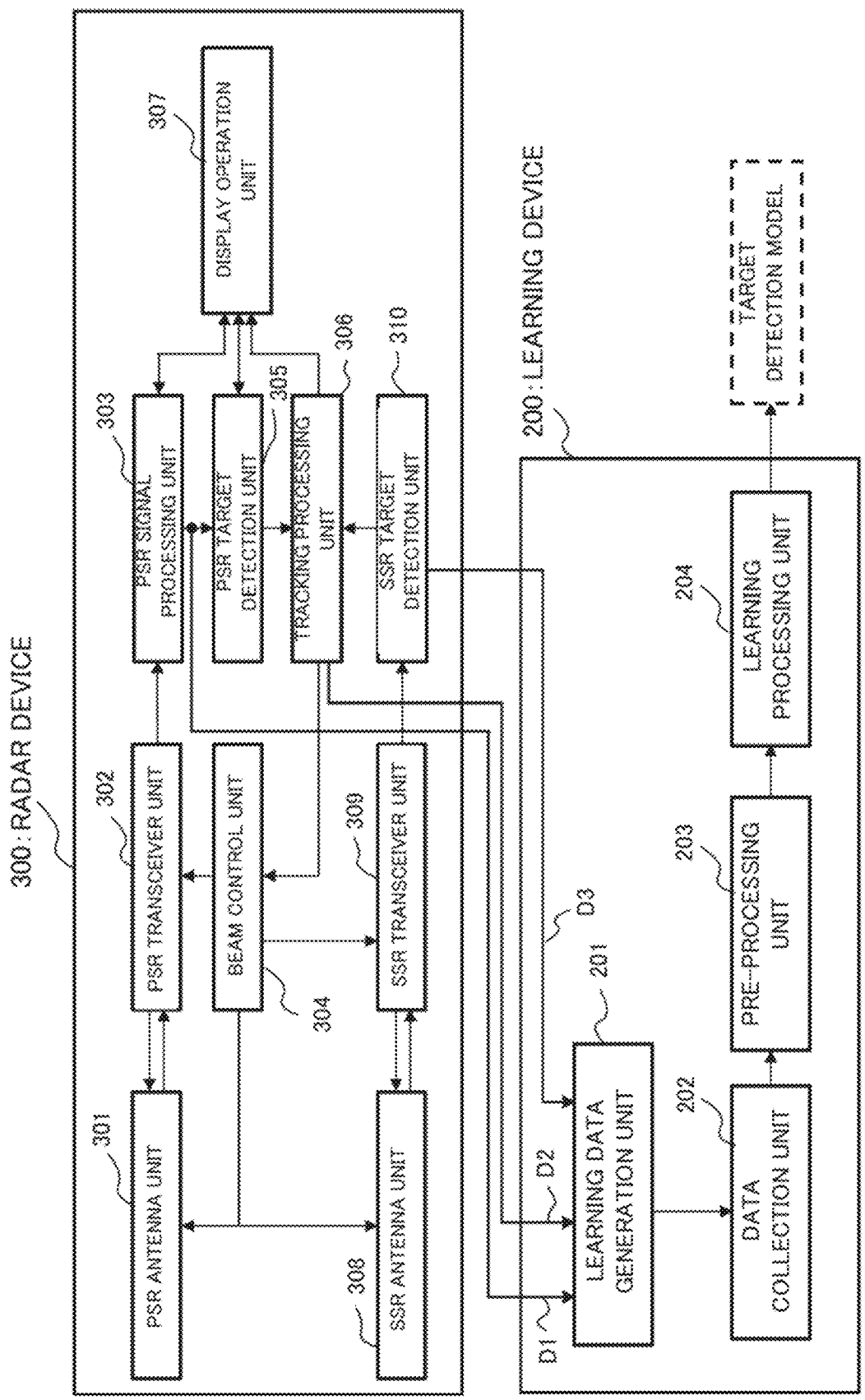
FIG. 11 illustrates a configuration of the radar device when a secondary radar is used.

FIG. 11 shows a configuration when the secondary radar (SSR: Secondary Surveillance Radar) is used. The radar device 300 using the SSR includes a PSR antenna unit 301, a PSR transceiver unit 302, a PSR signal processing unit 303, a beam control unit 304, a PSR target detection unit 305, a tracking processing unit 306, and a display operation unit 307. These units have the same configuration as the antenna unit 101, the transceiver unit 102, the signal processing unit 103, the beam control unit 104, the target detection unit 105, the tracking processing unit 106, and the display operation unit 107 shown in FIG. 1, and operate in the same manner. Further, the radar device 300 includes an SSR antenna unit 308, an SSR transceiver unit 309, and an SSR target detection unit 310.

The SSR transceiver unit 309 outputs an interrogation signal to the SSR antenna unit 308, and the SSR antenna unit 308 transmits an interrogation wave to the target. Further, the SSR antenna unit 308 receives the reply wave for the interrogation wave from the target and outputs the reply signal to the SSR transceiver unit 309. The SSR transceiver unit 309 performs A/D conversion or the like of the reply signal and outputs it to the SSR target detection unit 310. Since the reply signal includes the position information of the target, the SSR target detection unit 310 generates a plot of the target (referred to as an "SSR plot") based on the reply signal and outputs it to the tracking processing unit 306. The tracking processing unit 306 generates a track of the target using the plot of the target (referred to as a "PSR plot") detected by the PSR target detection unit 305 and the SSR plot.

To the learning data generation unit 201 of the learning device 200, the reception signal and the transmission/reception time (data D1) are inputted from the PSR signal processing unit 303, the SSR track (data D2) is inputted from the tracking processing unit 306, and the SSR plot (data D3) is inputted from the SSR target detection unit 310. The learning data generation unit 201 generates a teacher label indicating the position of the target using the SSR plot or the SSR track.

In the case of using the secondary radar, it is not ensured that the reply is acquired from all targets. In the case of an air defense radar or the like, aircrafts detected as the targets include military aircrafts or the like in addition to passenger aircrafts. An aircraft whose identity has been identified, such as a passenger aircraft and a military aircraft of their own country (hereinafter referred to as "a friendly aircraft") responds to the interrogation signal, but an aircraft whose identity cannot be identified, such as a military aircraft of other countries (hereinafter referred to as "an unknown aircraft") do not respond to the interrogation signal. Therefore, a teacher label cannot be generated for the reception signal including the unknown aircraft as the target. However, in the case of the air defense radar or the like, what we really want to detect and track is the unknown aircraft rather than the friendly aircraft.

In this view, a correct answer is generated for the unknown aircraft by the following method. As a premise, it is assumed that the targets that can be detected as the targets from the reception signals are three classes: "clutter (including noise)", "friendly aircraft" and "unknown aircraft". It is noted that, when the target is "clutter", it means that the target does not actually exist but the clutter is erroneously detected as the target. Here, the class that replies to the interrogation signal of the secondary radar and is given the teacher label (given the correct answer) is only the "friendly aircraft". In addition, the characteristics of the reception signals are similar for both "unknown aircraft" and "friendly aircraft" because they are actually aircrafts.

Under the above premise, the unknown aircraft is detected by the following procedure.

First, the learning data generation unit 201 generates a model for extracting the reception signals of "clutter", "friendly aircraft", and "unknown aircraft" from all the reception signals using the reception signals of "friendly aircraft" (Process 1).

Next, using the reception signals of "clutter", "friendly aircraft", and "unknown aircraft" thus extracted, the learning data generation unit 201 determines the reception signal having a characteristic close to the "friendly aircraft" among the reception signals that are not determined to be "friendly aircraft" (i.e., the reception signals determined to be "clutter" or "unknown aircraft") to be "unknown aircraft", and generates "unknown aircraft label" (Process 2).

Then, the learning data generation unit 201 generates a model for detecting "unknown aircraft" from the reception signals using the reception signals determined to be "unknown aircraft" and the "unknown aircraft label" (Process 3).

By this model, it becomes possible to detect unknown aircrafts which do not reply to the interrogation signal of the secondary radar from the reception signals.

In reality, it is conceivable that the accuracy of the "unknown aircraft label" generated in the above-described Process 2 becomes a problem. In that case, the "unknown aircraft label" may be given by hand of an operator or the like. By this method, it is sufficient to manually perform labelling of "unknown aircraft" only for the reception signals having a characteristic close to the "friendly aircraft" among the reception signals determined to be "clutter" or "unknown aircraft" extracted in the above-described Process 2. In other words, it is sufficient to manually perform labelling after narrowing down the reception signals to those having a high possibility of "unknown aircraft" by Process 1 and Process 2. Therefore, compared with the case where manual labeling is performed on the reception signals including all of "clutter", "friendly aircraft", and "unknown aircraft", the amount of manual work can be remarkably reduced.

(C) Use of Other Radar Devices

In the above example, SSR is used to acquire the position of the target and generate the teacher labels. However, when there are multiple radar devices, the learning data generation unit 201 may generate the teacher labels using the plots and the tracks acquired from other radar devices. Further, the learning data generation unit 201 may generate the teacher labels using the track (passive track) of the passive radar that only performs reception. Incidentally, the "passive track" is a result of tracking the jamming transmitter based on the jamming wave, and the learning data generation unit 201 can generate the estimated position of the jamming transmitter as the teacher label using the passive track.

(D) Use of Other Measurement Device

If the target aircraft is equipped with a positioning device such as GPS, the output may be received to generate a teacher label. In addition, a stereo camera or the like may be used to estimate the position of the target from the captured image of the target to generate the teacher label. Incidentally, when the target is a ship, the ship information may be received from the automatic vessel identification device (AIS: Automatic Identification System), and the position of the target may be acquired to generate the teacher label.

(E) Manual Labeling

The operator may apply a teacher label by viewing the plots, track, or the like displayed on the display operation unit 107.

(5) In Case of Radar Mounted on Mobile Body

In the above example embodiment, it is assumed that the radar device is installed on the ground. However, the method of the present example embodiment is also applicable to a radar device mounted on a mobile body such as an aircraft or a ship. In that case, as an input parameter used by the target detection model, the mobile body information (the position, the posture, the speed, the course and the like of the mobile body itself) relating to the mobile body on which the radar device is mounted may be used. Specifically, the mobile body information is inputted to the learning data generating device 201, and the learning processing unit 204 performs learning of the model using the mobile body information as the learning data, in addition to the reception signals. In the radar device 100x to which the learned model is applied, the mobile body information may be inputted to the pre-processing unit 113 or the target detection unit 114, and the target detection unit 114 may detect the target using the mobile body information.

(6) Efficient Data Collection by Radar Device

As mentioned previously, it is difficult to collect the learning data necessary for learning of the target detection model for rarely occurring situations. Therefore, the radar device 100 performs beam control for collection of learning data during the beam schedule. Particularly, if the pre-specified condition is satisfied, the radar device 100 performs the beam control intensively. The content of the beam control is changed to match the data to be collected.

Figure 12:
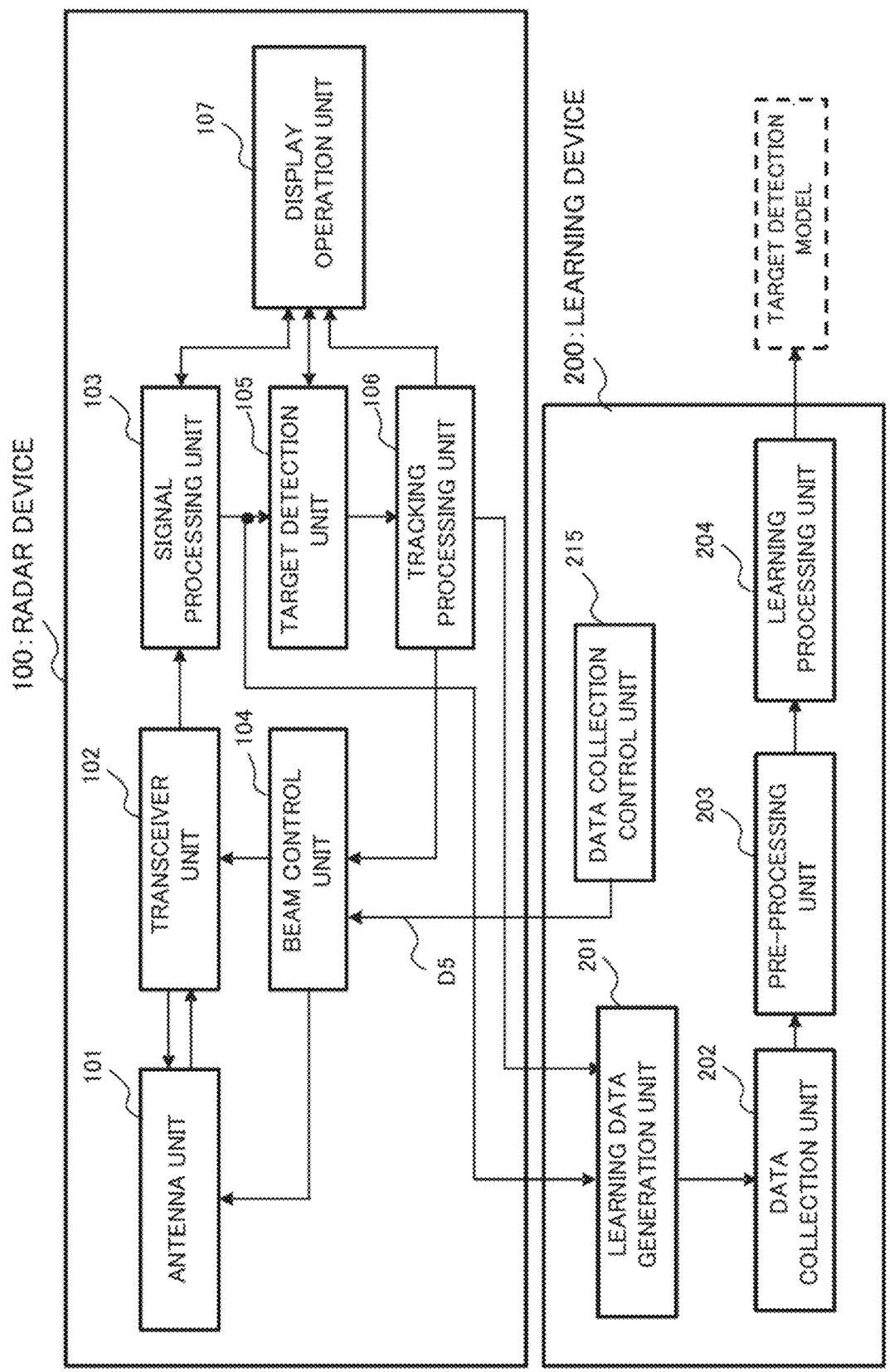
FIG. 12 illustrates a configuration for performing a beam control for collecting learning data.

FIG. 12 shows a configuration to perform the beam control for collection of learning data. The radar device 100 has the same configuration as in FIG. 3. Meanwhile, the learning device 200 includes a data collection control unit 215 in addition to the configuration shown in FIG. 3. The data collection control unit 215 stores a condition in which the learning data is insufficient, and outputs a data collection request D5 including the condition of the data to be collected to the beam control unit 104 of the radar device 100. During the beam schedule, the beam control unit 104 controls the antenna unit 101 to emit a beam under the condition indicated by the data collection request D5. The radar device 100 constantly monitors all directions by the scan beam and tracks the target by the tracking beam when the target is detected. Therefore, the beam control unit 104 can emit a beam for collecting learning data, when a target is not detected or when there is no need to track the target, for example. The reflected wave corresponding to the emitted beam is received by the antenna unit 101, and the reception signal is outputted to the learning data generation unit 201 through the transceiver unit 102 and the signal processing unit 103. Thus, the learning device 200 can collect data corresponding to the condition in which data is insufficient.

[Application of Learned Model]

(On-Line Learning)

When the learned target detection model (hereinafter, simply referred to as a "learned model") generated by the learning device 200 is actually applied to the radar device 100, the operation of the radar device 100 needs to be stopped because rewriting the program or the like occurs. However, the radar device performing important monitoring cannot be stopped. Therefore, the learned model cannot be applied, and the on-line learning is difficult.

Figure 13:
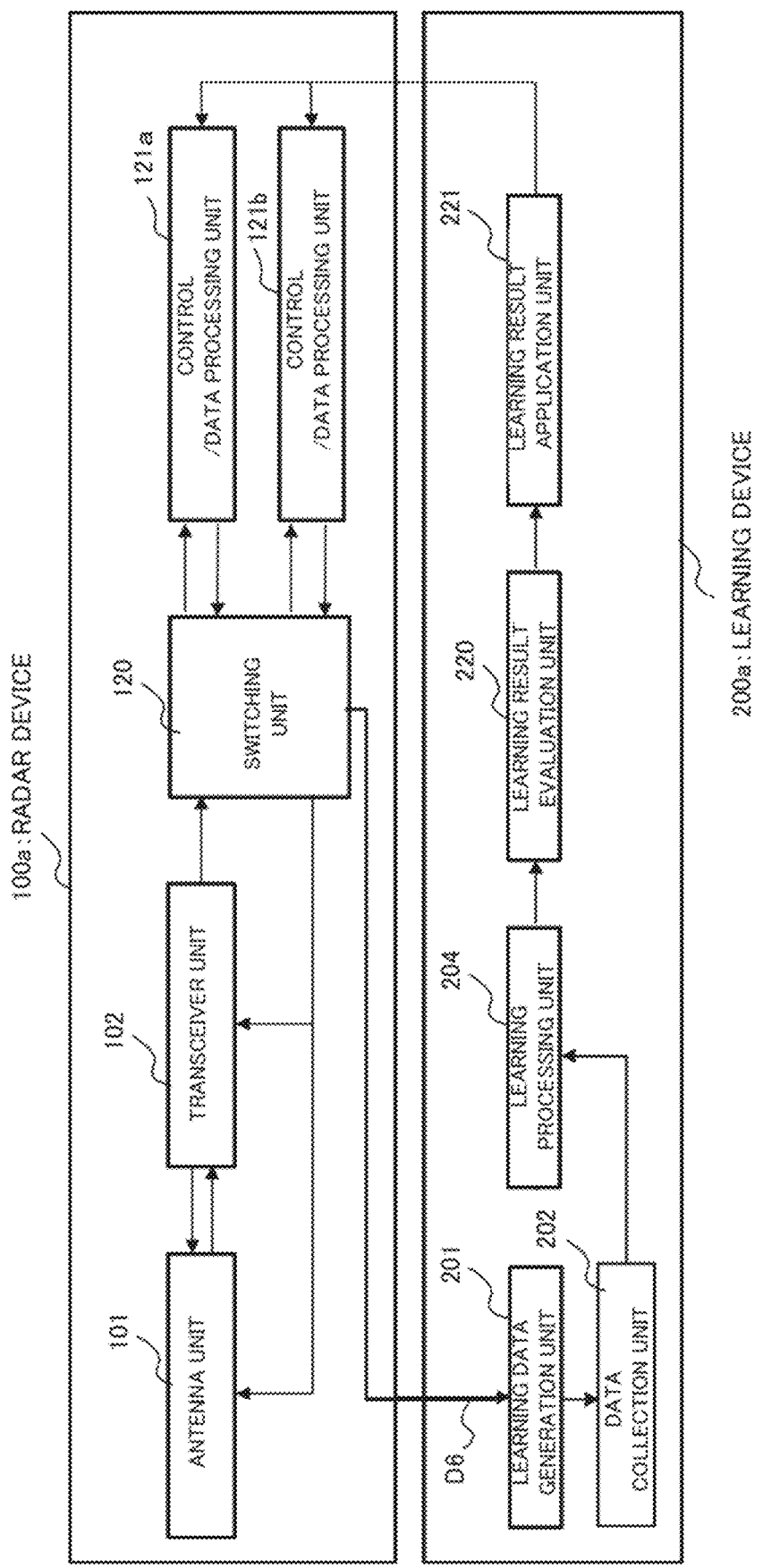
FIG. 13 illustrates a configuration for performing on-line learning.

In this view, the control/data processing unit of the radar device is doubled in advance. FIG. 13 shows a configuration of a radar device and a learning device for performing on-line learning. As illustrated, the radar device 100a includes an antenna unit 101, a transceiver unit 102, a switching unit 120, and two control/data processing units 121a and 121b. The control/data processing units 121a and 121b are units including a signal processing unit 103, a beam control unit 104, a target detection unit 105, a tracking processing unit 106, and a display operation unit 107 of the radar device shown in FIG. 1. The switching unit 120 selectively connects one of the control/data processing units 121a and 121b to the antenna unit 101 and the transceiver unit 102. In addition, the switching unit 120 outputs the data D6 including the reception signals, the plots, the track, and the like to the learning data generation unit 201 of the learning device 200a from the control/data processing unit 121a or 121b in operation.

The learning device 200a includes a learning result evaluation unit 220 and a learning result application unit 221 in addition to the learning data generation unit 201, the data collection unit 202, and the learning processing unit 204. The learning result evaluation unit 220 evaluates the learned model generated by the learning processing unit 204, and outputs the learned model determined to be applicable to the radar device 100a to the learning result application unit 221. The learning result application unit 221 applies the learned model determined to be applicable to the control/data processing units 121a and 121b.

It is now assumed that the control/data processing unit 121a is in the active state, i.e., during the actual monitoring operation, and the control/data processing unit 121b is in the standby state. Namely, the switching unit 120 is connecting the control/data processing unit 121a to the antenna unit 101 and the transceiver unit 102. In this case, the learning device 200a learns the target detection model using the data D6 outputted from the control/data processing unit 121a in the active state. During this time, the learning result applying unit 221 applies the learned model determined to be applicable to the control/data processing unit 121b in the standby state and rewrites the program.

Next, the switching unit 120 sets the control/data processing unit 121b to the active state, sets the control/data processing unit 121a to the standby state, and applies a new learned model to the control/data processing unit 121a in the standby state. In this way, it is possible to learn the target detection model while continuing the monitoring operation on one of the control/data processing units 121a and 121b and apply the learned model to the other of the control/data processing units 121a and 121b. Namely, it becomes possible to apply the learned model and to carry out the on-line learning.

(Evaluating Model Validity)

In the on-line learning, it is difficult to judge how much the learning should be made to ensure the appropriate radar function, i.e., the validity. Further, there is a fear that the target detection unit to which the learned model is applied may operate in an unexpected manner, e.g., it cannot detect a target that can be reliably detected by conventional processing, and recovery at that time is required. Therefore, the validity of the learned model is judged by operating the control/data processing unit to which the learned model is applied and the control/data processing unit in which the conventional processing is performed in parallel and comparing the processing results of them.

Figure 14:
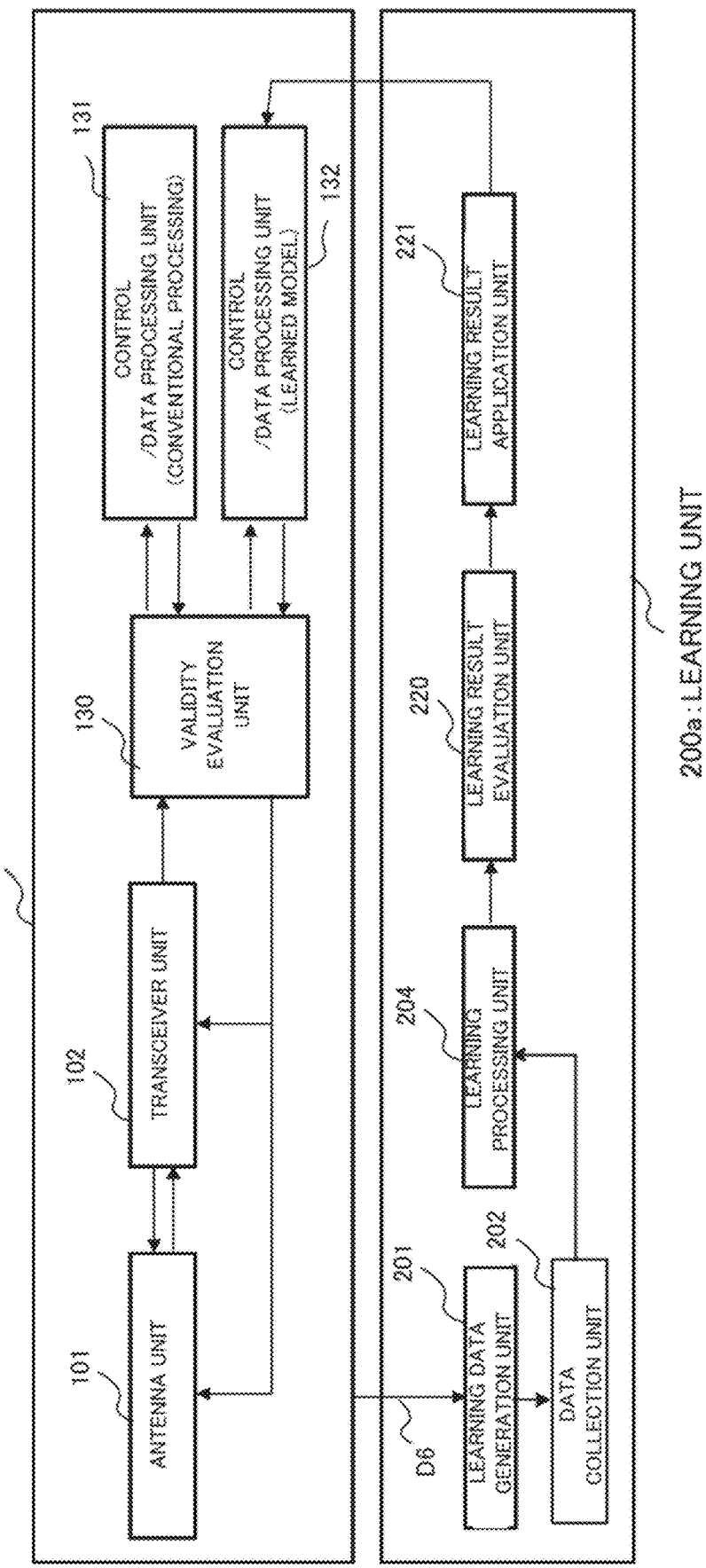
FIG. 14 illustrates a configuration for evaluating validity of a learned model.

FIG. 14 shows a configuration of a radar device and a learning device for performing validity evaluation of the learned model. As shown, the radar device 100b includes an antenna unit 101, a transceiver unit 102, a validity evaluation unit 130, and two control/data processing units 131 and 132. The control/data processing unit 131 performs the conventional processing, and the control/data processing unit 132 performs processing using the learned model. The control/data processing units 131 and 132 include a signal processing unit 103, a beam control unit 104, a target detection unit 105, a tracking processing unit 106, and a display operation unit 107 of the radar device shown in FIG. 1. The learning device 200a is the same as that shown in FIG. 13.

The validity evaluation unit 130 compares the processing result of the conventional processing performed by the control/data processing unit 131 with the processing result of the learned model performed by the control/data processing unit 132 to determine the validity of the processing result of the learned model. When it is determined that the processing result of the learned model is not appropriate, the validity evaluation unit 130 outputs the processing result of the conventional processing to the antenna unit 101 and the transceiver unit 102. On the other hand, when it is determined that the processing result of the learned model is appropriate, the validity evaluation unit 130 outputs the processing result of the learned model to the antenna unit 101 and the transceiver unit 102. Even when it is determined that the processing result of the learned model is appropriate, the validity evaluation unit 130 may interpolate the processing result of the learned model with the processing result of the conventional processing to prevent an unexpected operation from occurring. Further, the validity evaluation unit 130 may be generated using machine learning or the like. Further, it is not necessary that the processing of the validity evaluation unit 130 is fully automatic, and the operator may be interposed. For example, the operator may determine the validity of the processing result of the learned model based on the information displayed on the display operation unit 107.

(Suppressing Operational Fluctuation in Using the Learned Model)

When the learned model is applied to the target detection unit, the operation of the radar device 100 may change significantly. Therefore, the control/data processing unit of the radar device 100 is doubled in advance, the learned model is applied with intentionally shifting the time of applying the learned model, and the results of the processing of the two control/data processing units are integrated to be adopted as a formal processing result.

Figure 15:
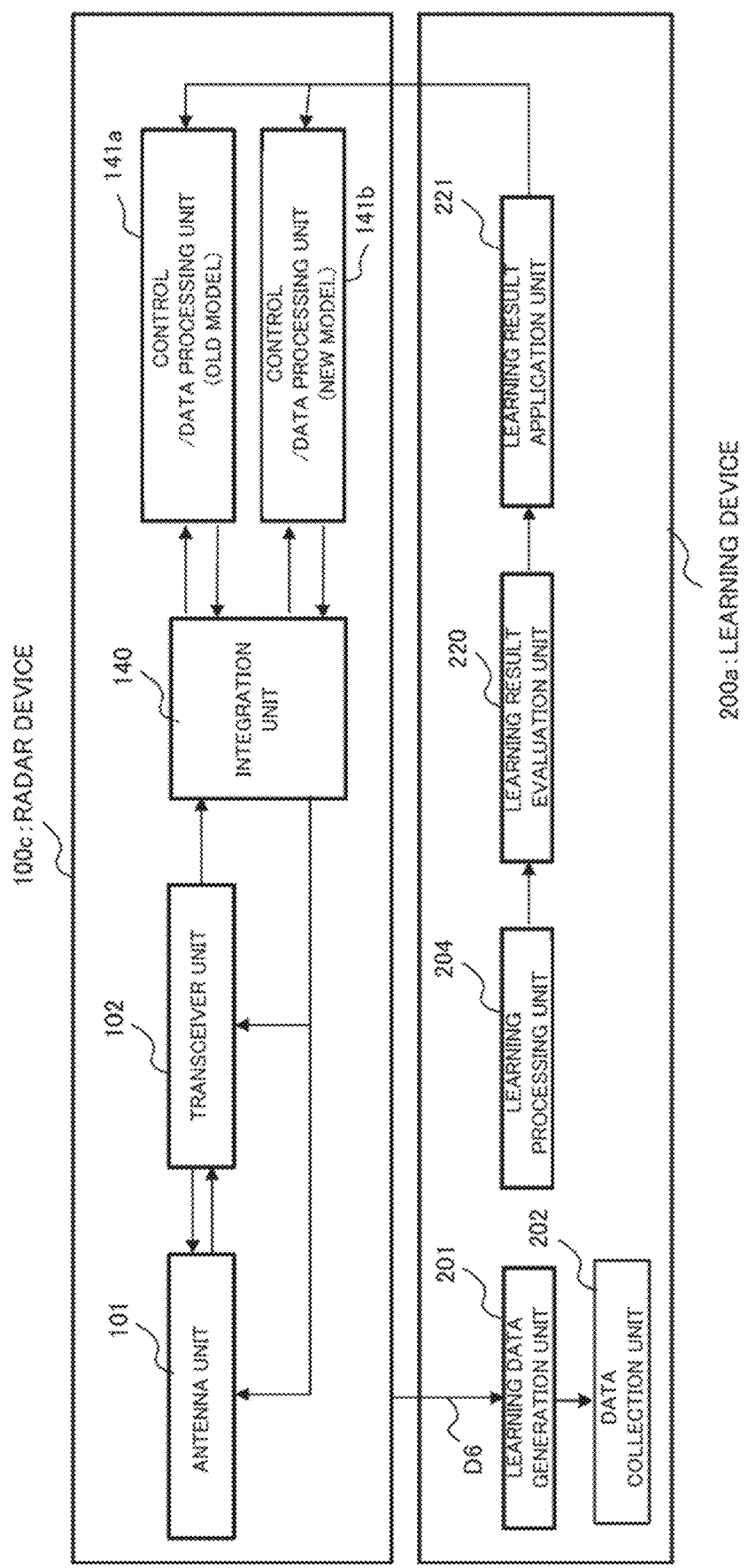
FIG. 15 illustrates a configuration for suppressing operation fluctuation by a learned model.

FIG. 15 shows a configuration of a radar device and a learning device for suppressing operational fluctuation by the learned model. As illustrated, the radar device 100c includes an antenna unit 101, a transceiver unit 102, an integration unit 140, and two control/data processing units 141a and 141b. The control/data processing unit 141a uses the old model, and the control/data processing unit 141b uses the new model to perform processing. The control/data processing units 141a and 141b are units including the signal processing unit 103, the beam control unit 104, the target detection unit 105, the tracking processing unit 106, and the display operation unit 107 of the radar device shown in FIG. 1. The learning device 200a is the same as that shown in FIG. 13.

The integration unit 140 integrates the processing results of the control/data processing units 141a and 141b and employs the integrated result as a formal processing result. For example, the integrating unit 140 adds the processing results from the control/data processing units 141a and 141b, divides the result of the addition by 2, and employs the result as the processing result. Thus, it becomes possible to suppress that the operation of the radar device fluctuates greatly when a new learned model is applied.

Second Example Embodiment

Figure 16A:
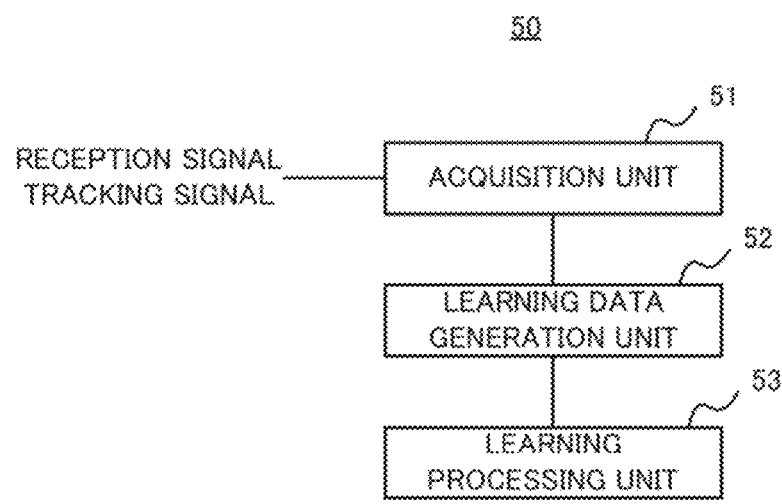
FIGS. 16A and 16B illustrate configurations of a learning device and a radar device according to a second example embodiment.

FIG. 16A is a block diagram illustrating a functional configuration of a learning device according to a second example embodiment. The learning device 50 according to the second example embodiment includes an acquisition unit 51, a learning data generation unit 52, and a learning processing unit 53. The acquisition unit 51 acquires a reception signal generated based on a received wave and a tracking signal generated based on the reception signal from the radar device. The learning data generation unit 52 generates learning data using the reception signal and the tracking signal. The learning processing unit 53 learns a target detection model for detecting a target from the reception signal using the learning data.

Figure 16B:
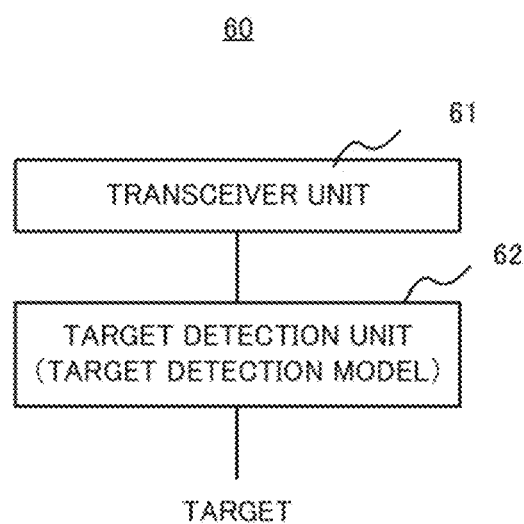

FIG. 16B is a block diagram illustrating a functional configuration of a radar device according to a second example embodiment. The radar device 60 includes a transceiver unit 61, and a target detection unit 62. The transceiver unit 61 transmits a transmission wave, and generates a reception signal by receiving a received wave corresponding to the transmission wave. The target detection unit 62 detects the target from the reception signal using a learned target detection model which is learned using the learning data generated based on the reception signal acquired from the radar device.

A part or all of the example embodiments described above may also be described as the following supplementary notes, but not limited thereto.

(Supplementary Note 1)

A learning device comprising:
  an acquisition unit configured to acquire a reception signal generated based on a received wave and a tracking signal generated based on the reception signal from a radar device;
  a learning data generation unit configured to generate learning data using the reception signal and the tracking signal; and
  a learning processing unit configured to learn a target detection model for detecting a target from the reception signal, using the learning data.

(Supplementary Note 2)

The learning device according to Supplementary note 1,
  wherein the tracking signal includes a plot and a track of the target, and
  wherein the learning data generation unit generates a teacher label indicating presence or absence of the target and a position of the target in the reception signal using the plot and the track.

(Supplementary Note 3)

The learning device according to Supplementary note 2, wherein the learning data generation unit generates a pair of the reception signal and the teacher label as the learning data.

(Supplementary Note 4)

The learning device according to any one of Supplementary notes 1 to 3, further comprising a pre-processing unit configured to perform pre-processing of the reception signal included in the learning data,
wherein the learning processing unit performs learning of the target detection model using the reception signal after the pre-processing.

(Supplementary Note 5)

The learning device according to Supplementary note 4, wherein the pre-processing is processing of trimming the reception signal to a predetermined size.

(Supplementary Note 6)

The learning device according to Supplementary note 4 or 5, wherein the pre-processing is processing of integrating the reception signals corresponding to a plurality of adjacent beams emitted by the radar device or the reception signals corresponding to a plurality of adjacent scans performed by the radar device.

(Supplementary Note 7)

The learning device according to any one of Supplementary notes 4 to 6, wherein the pre-processing is processing of decreasing SNR of the reception signal.

(Supplementary Note 8)

The learning device according to any one of Supplementary notes 1 to 7, wherein the learning data generation unit synthesizes a plurality of reception signals generated under different conditions to generate a reception signal under a desired condition.

(Supplementary Note 9)

The learning device according to any one of Supplementary notes 1 to 8,
wherein the reception signal is a processed signal after demodulation processing and coherent integration processing in the radar device, and
wherein the learning data generation unit applies, to the processed signal, inverse coherent integration processing that is an inverse processing of the coherent integration processing and modulation processing that is an inverse processing of the demodulation processing using a beam specification different from the processed signal to generate the reception signal of a desired beam specification.

(Supplementary Note 10)

The learning device according to Supplementary note 2, wherein the learning data generation unit generates the teacher label using plots and tracks acquired from a secondary radar of the radar device.

(Supplementary Note 11)

The learning device according to Supplementary note 2, wherein the learning data generation unit acquires the position of the target from the target itself or another device to generate the teacher label.

(Supplementary Note 12)

The learning device according to any one of Supplementary notes 1 to 11, further comprising a request unit configured to request the radar device to transmit a transmission wave matching a predetermined condition to generate the reception signal corresponding to the condition.

(Supplementary Note 13)

The learning device according to any one of Supplementary notes 1 to 12,
wherein the radar device is mounted on a mobile body,
wherein the acquisition unit acquires mobile body information including the position and movement information of the mobile body, and
wherein the learning data generation unit generates the learning data using the mobile body information.

(Supplementary Note 14)

A learning method comprising:
acquiring a reception signal generated based on a received wave and a tracking signal generated based on the reception signal from a radar device;
generating learning data using the reception signal and the tracking signal; and
learning a target detection model for detecting a target from the reception signal, using the learning data.

(Supplementary Note 15)

A recording medium recording a program, the program causing a computer to execute processing of:
acquiring a reception signal generated based on a received wave and a tracking signal generated based on the reception signal from a radar device;
generating learning data using the reception signal and the tracking signal; and
learning a target detection model for detecting a target from the reception signal, using the learning data.

(Supplementary Note 16)

A radar device comprising:
a transceiver unit configured to transmit a transmission wave and receive a reception signal corresponding to the transmission wave; and
a target detection unit configured to detect a target from the reception signal using a target detection model learned using learning data generated based on the reception signal acquired from the radar device.

(Supplementary Note 17)

The radar device according to Supplementary note 16, further comprising a pre-processing unit configured to apply pre-processing necessary for data to be inputted to the target detection model to the reception signal and input the reception signal after the pre-processing to the target detection unit.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

100 Radar device
101 Antenna unit
102 Transceiver unit
103 Signal processing unit
104 Beam control unit
105 Target detection unit
106 Tracking processing unit
107 Display operation unit
110 Demodulation processing unit
111 Coherent integration unit
113 Pre-processing unit
114 Target detection unit
200 Learning device
201 Learning data generation unit 202 Data collection unit
203 Pre-processing unit
204 Learning processing unit

What is claimed is:

1. A system comprising:
a radar device; and
a learning device,
wherein the learning device comprises:
a memory storing instructions; and
one or more processors configured to execute the instructions to:
acquire a reception signal of a predetermined beam specification based on a received wave and a tracking signal generated based on the reception signal from the radar device, wherein
the reception signal is a processed signal after demodulation processing and coherent integration processing in the radar device,
the reception signal is generated by applying, to the processed signal, inverse coherent integration processing that is an inverse processing of the coherent integration processing and modulation processing that is an inverse processing of the demodulation processing using a beam specification different from the processed signal;
generate learning data using the reception signal and the tracking signal; and
learn a new target detection model for detecting a target from the reception signal, using the learning data, wherein
the new target detection model differs from an old target detection model for detecting the target from the reception signal,
wherein the radar device comprises:
a transceiver to generate a transmission signal based on a transmission wave specification;
an antenna unit to amplify the generated transmission signal and emit a transmission wave in a provided direction;
a first control/data processing unit to perform processing using the old target detection model for detecting the target;
a second control/data processing unit to perform processing using the new target detection model for detecting the target from the reception signal; and
an integration unit that integrates processing results of the first and second control/data processing units to generate the transmission wave specification on which basis the transceiver generates the transmission signal and to generate the provided direction in which the antenna unit emits the transmission wave;
and wherein integration of the processing results of the first and second control/data processing units reduces operation fluctuation of the radar device as a result of the new target detection model.

2. The system according to claim 1,
wherein the tracking signal includes a plot and a track of the target, and
wherein the one or more processors generate a teacher label indicating presence or absence of the target and a position of the target in the reception signal using the plot and the track.

3. The system according to claim 2, wherein the one or more processors generate a pair of the reception signal and the teacher label as the learning data.

4. The system according to claim 2, wherein the one or more processors generate the teacher label using plots and tracks acquired from a secondary radar of the radar device.

5. The system according to claim 2, wherein the one or more processors acquire the position of the target from the target itself or another device to generate the teacher label.

6. The system according to claim 1,
wherein the one or more processors are further configured to perform pre-processing of the reception signal included in the learning data,
wherein the one or more processors perform learning of the target detection model using the reception signal after the pre-processing.

7. The system according to claim 6, wherein the pre-processing is trimming the reception signal to a predetermined size.

8. The system according to claim 6, wherein the pre-processing is integrating multiple reception signals corresponding to a plurality of adjacent beams emitted by the radar device or the reception signals corresponding to a plurality of adjacent scans performed by the radar device.

9. The system according to claim 6, wherein the pre-processing is decreasing SNR of the reception signal.

10. The system according to claim 1, wherein the one or more processors synthesize a plurality of reception signals generated under different conditions to generate a reception signal under a predetermined condition.

11. The system according to claim 1,
wherein the one or more processors are further configured to request the radar device to transmit a transmission wave matching a predetermined condition to generate the reception signal corresponding to the condition.

12. The system according to claim 1,
wherein the radar device is mounted on a mobile body,
wherein the one or more processors acquire mobile body information including position and movement information of the mobile body, and
wherein the one or more processors generate the learning data using the mobile body information.

13. A method comprising:
acquiring, by a learning device, a reception signal of a predetermined beam specification based on a received wave and a tracking signal generated based on the reception signal from a radar device, wherein
the reception signal is a processed signal after demodulation processing and coherent integration processing in the radar device,
the reception signal is generated by applying, to the processed signal, inverse coherent integration processing that is an inverse processing of the coherent integration processing and modulation processing that is an inverse processing of the demodulation processing using a beam specification different from the processed signal;
generating, by the learning device, learning data using the reception signal and the tracking signal;
learning, by the learning device, a new target detection model for detecting a target from the reception signal, using the learning data, wherein
the new target detection model differs from an old target detection model for detecting the target from the reception signal,
generating, by a transceiver of the radar device, a transmission signal based on a transmission wave specification;
amplifying, by an antenna unit of the radar device, the generated transmission signal;

emitting, by the antenna unit, a transmission wave in a provided direction;

performing, by a first control/data processing unit of the radar device, processing using the old target detection model for detecting the target;

performing, by a second control/data processing unit of the radar device, processing using the new target detection model for detecting the target from the reception signal; and integrating, by an integration unit of the radar device, processing results of the first and second control/data processing units to generate the transmission wave specification on which basis the transceiver generates the transmission signal and to generate the provided direction in which the antenna unit emits the transmission wave, wherein integration of the processing results of the first and second control/data processing units reduces operation fluctuation of the radar device as a result of the new target detection model.

* * * * *